United States Patent
Todd

(10) Patent No.: US 6,924,254 B2
(45) Date of Patent: Aug. 2, 2005

US006924254B2

(54) VISCOUS WELL TREATING FLUIDS AND METHODS

(75) Inventor: Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 308 days.

(21) Appl. No.: 10/393,302

(22) Filed: Mar. 20, 2003

(65) Prior Publication Data

US 2004/0186024 A1 Sep. 23, 2004

(51) Int. Cl.⁷ .................................................. C09K 3/00
(52) U.S. Cl. ................ 507/268; 507/211; 507/212; 507/213; 507/217; 507/239; 507/241; 507/269; 507/272; 507/276; 507/277; 507/927; 507/929
(58) Field of Search .................. 507/268, 211–213, 507/217, 239, 241, 269, 272, 276, 277, 927, 929

(56) References Cited

U.S. PATENT DOCUMENTS

| | | | | |
|---|---|---|---|---|
| 5,616,616 A | * | 4/1997 | Hall et al. | .................... 514/557 |
| 6,255,266 B1 | * | 7/2001 | Gupta et al. | ................. 510/175 |
| 2003/0031864 A1 | * | 2/2003 | Clikeman et al. | ............ 428/343 |

FOREIGN PATENT DOCUMENTS

| | | | |
|---|---|---|---|
| EP | 0559418 A2 | 9/1993 | ........... E21B/43/26 |
| EP | 0916806 A2 | 5/1999 | ........... E21B/43/26 |

* cited by examiner

*Primary Examiner*—Philip C. Tucker
(74) *Attorney, Agent, or Firm*—Robert A. Kent; C. Clark Dougherty, Jr.

(57) ABSTRACT

Viscous well treating fluids and methods of treating subterranean zones penetrated by well bores are provided. The viscous fluids are basically comprised of water, a gelling agent and a delayed viscosity breaker comprising pentanedione peroxide.

45 Claims, No Drawings

VISCOUS WELL TREATING FLUIDS AND METHODS

BACKGROUND OF THE INVENTION

1. Field of the Invention

The present invention relates to viscous fluids for treating subterranean zones penetrated by well bores which include delayed viscosity breakers.

2. Description of the Prior Art

Viscous fluids are commonly utilized for treating subterranean zones penetrated by well bores. One such treatment is gravel packing. In gravel packing operations, solid gravel particles such as sand are carried into a subterranean zone in which a gravel pack is to be placed by a viscous fluid. That is, the gravel is suspended in the viscous fluid at the surface and carried to the subterranean zone in which a gravel pack is to be placed. Once the gravel is placed in the zone, the viscous fluid is broken (the viscosity is reduced) and recovered (returned to the surface). The gravel pack produced functions as a filter to separate formation sand and fines from produced fluids while permitting the produced fluids to flow into and through the well bore.

Another example of a well completion operation involves the use of viscous fluids known as drill-in fluids. The drill-in fluids are utilized when open-hole well bores are drilled into producing subterranean zones to minimize damage to the permeability of the zones and their ability to produce hydrocarbons. The drill-in fluid deposits filter cake on the walls of the well bore within the subterranean zone which prevents the drill-in fluid from being lost into the subterranean zone and prevents solids from entering the porosities of the subterranean zone. The filter cake which is made up of a bridging agent and gelled drill-in fluid is subsequently broken by contact with a clean-up fluid containing a delayed viscosity breaker.

After viscous treating fluids have been utilized in gravel packing treatments, drill-in treatments and other treatments conducted in subterranean zones penetrated by well bores, the viscous fluids utilized are broken, i.e., the viscous fluids are caused by delayed viscosity breakers therein to revert to thin fluids whereby they can readily be recovered from the subterranean zones.

While a variety of delayed viscosity breakers have been utilized heretofore, such breakers have often been hazardous to the health of personnel, are flammable and react with materials and components in the well bore which reduces the ability of the breaker to break viscous fluids. Also, a number of the heretofore used breakers have not been soluble in water which makes them difficult to utilize. Thus, there are continuing needs for improved delayed viscosity breakers, viscous fluids containing the breakers and methods of treating subterranean zones with viscous fluids containing improved delayed viscosity breakers.

SUMMARY OF THE INVENTION

The present invention provides viscous fluids for treating subterranean zones penetrated by well bores which include improved delayed viscosity breakers, and methods of treating subterranean zones penetrated by well bores utilizing viscous fluids containing improved delayed viscosity breakers. A viscous fluid of this invention for treating a subterranean zone penetrated by a well bore comprises water, a gelling agent and a delayed viscosity breaker comprising pentanedione peroxide.

A method of treating a subterranean zone penetrated by a well bore of this invention comprises the following steps. A viscous treating fluid comprising water, a gelling agent and a delayed viscosity breaker comprising pentanedione peroxide is provided. Thereafter, the treating fluid is introduced into a subterranean zone.

As mentioned, the viscous fluids of this invention can be utilized for conducting a variety of treatments in wells including, but not limited to, forming gravel packs in well bores adjacent to producing zones, functioning as drill-in fluids in producing zones and various other treatments conducted in well bores.

A clean-up fluid of this invention for breaking a drill-in fluid filter cake comprises water, salt and a pentanedione peroxide breaker.

A method of breaking a drill-in fluid filter cake comprises the following steps. A clean-up fluid comprising water, salt and a pentanedione peroxide gel breaker is provided. Thereafter, the drill-in fluid filter cake is contacted with the clean-up fluid.

The objects, features and advantages of the present invention will be readily apparent to those skilled in the art upon a reading of the description of preferred embodiments which follows.

DESCRIPTION OF PREFERRED EMBODIMENTS

The present invention provides improved viscous fluids and methods for treating subterranean zones penetrated by well bores. The improved viscous fluids basically comprise water, a gelling agent and a delayed viscosity breaker comprising pentanedione peroxide.

The methods of the invention for treating subterranean zones comprise the following steps. A viscous treating fluid comprising water, a gelling agent and a delayed viscosity breaker comprised of pentanedione peroxide is provided. The treating fluid is then introduced into a subterranean zone.

The water in the viscous fluids for treating subterranean zones of this invention can be fresh water or salt water. Generally, salt is added to the water to provide clay stability and to increase the density of the viscous fluids. Examples of salts that can be used include, but are not limited to, sodium chloride, sodium bromide, calcium chloride, calcium bromide, potassium chloride and mixtures thereof. The salt or salts used can be present in the salt water in an amount up to about 66% by weight thereof and the salt water can have a density up to about 15.5 pounds per gallon.

Examples of gelling agents that can be included in the viscous fluids include, but are not limited to, xanthan, guar, hydroxyethylguar and starch. Of these, xanthan is generally preferred. The gelling agent is generally present in the viscous fluids in an amount in the range of from about 0.25% to about 1% by weight of water in the fluids, more preferably in an amount of about 0.4% to about 0.75% and most preferably about 0.57%.

As indicated above, the delayed viscosity breaker utilized in accordance with this invention is pentanedione peroxide. The exposure to pentanedione peroxide is less dangerous to human health than other viscosity breakers and it is not highly flammable or reactive. In addition, pentanedione peroxide functions very well as a delayed viscous fluid breaker and the time required for pentanedione peroxide to break a viscous fluid can be controlled by the addition of one or two activators to the viscous fluid containing the pentanedione peroxide. A particularly suitable activator for the pentanedione peroxide breaker is a copper-ethylenediaminetetraacetic acid chelate, hereinafter referred to as a copper-EDTA chelate.

A second activator which can be combined with the copper-EDTA chelate activator to decrease the time required for the viscous fluid to break is a diethylene triamine activator.

The pentanedione peroxide breaker is generally included in the viscous fluids of this invention in an amount in the range of from about 0.1% to about 5% by weight of water in the fluids. When a copper-EDTA chelate activator is utilized with the pentanedione peroxide, it is included in the viscous fluids in an amount up to about 0.2% by weight of the pentanedione peroxide in the fluids. When a diethylene triamine activator is also included in the viscous fluids, it is present therein in an amount up to about 2% by weight of the pentanedione peroxide in the fluids. Depending upon the quantity of pentanedione peroxide included in the viscous fluids and the presence and amounts of activators included therewith, the viscous fluids can be broken in a time period as short as 1 to 2 hours to as long as 7 days. The viscous fluids can also include a clay stabilizing salt and various other chemicals that may be required to disperse the gelling agent utilized in the water, to cause the gelling agent to hydrate and to prevent other problems from occurring. For example, when a xanthan gelling agent is utilized, a small amount of citric acid is included in the water to prevent the cross-linking of the xanthan gelling agent with iron that may be dissolved in the water. A small amount of hydrochloric acid can also be added to the water to facilitate the dispersion of the xanthan gelling agent in the water. Sodium hydroxide or other caustic can then be added to the water to raise its pH and thereby allow the xanthan gelling agent to hydrate and yield a viscous fluid.

As mentioned above, a viscous fluid of this invention can be utilized as a drill-in fluid which produces a filter cake on the walls of a well bore being drilled to prevent damage to the permeability thereof. In this application, the viscous fluid can be comprised of water, a xanthan gelling agent, starch for forming a starch gel, calcium carbonate bridging agent and a pentanedione peroxide breaker. A filter cake comprised of xanthan gel, starch gel and calcium carbonate bridging agent is formed in the well bore. When the pentanedione peroxide breaker is activated, it causes the viscous fluid to revert to a thin fluid and breaks the filter cake on the walls of the well bore whereby the fluid and filter cake can be removed and recovered.

In some applications for breaking a drill-in fluid filter cake, a clean-up fluid comprising water, salt and a pentanedione peroxide breaker is used. The clean-up fluid breaks the gel or gels in the filter cake whereby the filter cake can be removed.

A method of breaking a drill-in fluid filter cake comprises the steps of: (a) providing a clean-up fluid comprising water, salt and a pentanedione peroxide gel breaker; and (b) contacting the drill-in filter cake with the clean-up fluid.

A viscous fluid of this invention for treating a subterranean zone penetrated by a well bore comprises: water; a gelling agent; and a delayed viscosity breaker comprising pentanedione peroxide.

Another viscous fluid of this invention for treating a subterranean zone penetrated by a well bore comprises: water; a xanthan gelling agent; a delayed viscosity breaker comprising pentanedione peroxide; and a copper-EDTA chelate activator.

Yet another viscous fluid of this invention for treating a subterranean zone penetrated by a well bore comprises: water; a xanthan gelling agent; a delayed viscosity breaker comprising pentanedione peroxide; a copper-EDTA chelate activator; and a diethylene triamine activator.

A method of treating a subterranean zone penetrated by a well bore of this invention comprises the steps of: (a) providing a viscous treating fluid comprising water, a gelling agent and a delayed viscosity breaker comprising pentanedione peroxide; and (b) introducing the treating fluid into the subterranean zone.

Another method of treating a subterranean zone penetrated by a well bore of this invention comprises the steps of: (a) providing a viscous treating fluid comprising water, a gelling agent, a delayed viscosity breaker comprising pentanedione peroxide and a copper-EDTA activator; and (b) introducing the treating fluid into the subterranean zone.

Yet another method of treating a subterranean zone penetrated by a well bore of this invention comprises the steps of: (a) providing a viscous treating fluid comprising water, a gelling agent and a delayed viscosity breaker comprising pentanedione peroxide, a copper-EDTA chelate activator and a diethylene triamine activator; and (b) introducing the treating fluid into the subterranean zone.

A clean-up fluid of this invention for removing filter cake from the walls of a well bore comprises: water; a salt for stabilizing clay and increasing the density of the clean-up fluid; and a delayed viscosity breaker comprising pentanedione peroxide.

In order to further illustrate the viscous treating fluids and methods of the present invention, the following examples are given.

EXAMPLE 1

A viscous treating fluid was prepared in the laboratory comprised of 1 liter of tap water, 0.94 grams of citric acid, 0.5 milliliters of 20° Be hydrochloric acid, 6 grams of xanthan gelling agent and 2.7 milliliters of a 50 percent sodium hydroxide solution. The mixture of components produced was mixed for 30 minutes and then the mixture was neutralized to a pH of 7 with hydrochloric acid. Thereafter, 263.4 grams of potassium chloride were added to the viscous fluid produced and the viscous fluid was mixed until the salt was dissolved.

200 milliliter portions of the viscous fluid were poured in 5 jars and various amounts of pentanedione peroxide breaker was added to 4 of the jars along with various amounts of one or both of the copper-EDTA chelate activator and diethylene triamine activator. The samples in the jars were stirred and then placed in baths at 130° F. The viscosities of the viscous fluids in the jars were measured at 2 hour intervals and then at 24 hour intervals until the viscous fluids were broken. The results of these tests are set forth in Table I below.

TABLE I

| Viscous Fluid Break Times | | | | | |
|---|---|---|---|---|---|
| | Sample | | | | |
| | 1 | 2 | 3 | 4 | 5 |
| Pentanedione Peroxide Breaker, ml | 0 | 5 | 5 | 5 | 2 |
| Aqueous Copper-EDTA Activator Solution, ml | 0 | 0.5 | 0 | 0.5 | 0.5 |
| Aqueous Diethylene Triamine | 0 | 0 | 0.5 | 0.5 | 0.5 |

TABLE I-continued

Viscous Fluid Break Times

| | Sample | | | | |
|---|---|---|---|---|---|
| | 1 | 2 | 3 | 4 | 5 |
| Activator Solution, ml | | | | | |
| Viscosity at 2.75 hrs, cp. | 27 | 27 | 27 | 25 | 25 |
| Viscosity at 1 day, cp. | 26 | 19 | 16.5 | 5 | 5 |
| Viscosity at 2 days, cp. | 26 | 4 | 4.5 | 2 | 2 |
| Viscosity at 3 days, cp. | 27 | 3.5 | 3 | 2 | 2 |
| Viscosity at 6 days, cp. | 26 | 3 | 2 | 2 | 2 |

From the results set forth in Table I, it can be seen that the delayed breaker of this invention functions well.

EXAMPLE 2

1 liter of a fluid consisting of fresh water, and 48 grams of starch was prepared, heated to a boil, held for one minute while stirring and cooled to room temperature. Five 200 milliliter samples were placed in jars and varying amounts of the pentanedione peroxide delayed breaker were added to the jars. The jars were placed in 130° water baths for 24 hours after which they were cooled to room temperature. The viscosities of the viscous fluids in the jars were measured at 24 hour intervals until the viscous fluids were broken. The results of these tests are shown in Table II below.

TABLE II

Viscous Fluid Break Times

| | Sample | | | | |
|---|---|---|---|---|---|
| | 1 | 2 | 3 | 4 | 5 |
| Pentanedione Peroxide Breaker, ml | 0 | 1 | 2 | 5 | 10 |
| Viscosity at 0 days, cp. | 72 | 72 | 72 | 72 | 72 |
| Viscosity at 1 day, cp. | 79 | 77 | 84 | 75 | 67 |
| Viscosity at 2 days, cp. | 85 | 60 | 65 | 61 | 66 |
| Viscosity at 4 days, cp. | 84 | 7 | 4 | 2.5 | 3 |

From the results set forth in Table II, it can be seen that the delayed breaker of this invention functions well.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A viscous fluid for treating a subterranean zone penetrated by a well bore comprising:
   water;
   a gelling agent; and
   a delayed viscosity breaker comprising pentanedione peroxide.

2. The viscous fluid of claim 1 wherein said water is selected from the group consisting of fresh water and salt water.

3. The viscous fluid of claim 1 wherein said gelling agent is selected from the group consisting of xanthan, guar, hydroxyethylguar and starch.

4. The viscous fluid of claim 1 wherein said gelling agent is xanthan.

5. The viscous fluid of claim 1 wherein said gelling agent is present in an amount in the range of from about 0.25% to about 1% by weight of water in said fluid.

6. The viscous fluid of claim 1 wherein said pentanedione peroxide is present in an amount in the range of from about 0.1% to about 5% by weight of water in said fluid.

7. The viscous fluid of claim 1 which further comprises a copper-EDTA chelate activator.

8. The viscous fluid of claim 7 wherein said copper-EDTA chelate activator is present in an amount up to about 0.2% by weight of said pentanedione peroxide in said fluid.

9. The viscous fluid of claim 1 which further comprises a diethylene triamine activator.

10. The viscous fluid of claim 9 wherein said diethylene triamine activator is present in an amount up to about 2% by weight of said pentanedione peroxide in said fluid.

11. The viscous fluid of claim 1 which further comprises a clay stabilizing and density increasing salt.

12. The viscous fluid of claim 11 wherein said salt is selected from the group consisting of sodium chloride, sodium bromide, calcium chloride, calcium bromide, potassium chloride and mixtures thereof.

13. The viscous fluid of claim 11 wherein said clay stabilizing and density increasing salt is potassium chloride.

14. The viscous fluid of claim 11 wherein said clay stabilizing and density increasing salt is present in an amount up to about 66% by weight of water in said fluid.

15. A method of treating a subterranean zone penetrated by a well bore comprising the steps of:
   (a) providing a viscous treating fluid comprising water, a gelling agent and a delayed viscosity breaker comprising pentanedione peroxide; and
   (b) introducing said treating fluid into said subterranean zone.

16. The method of claim 15 wherein said water is selected from the group consisting of fresh water and salt water.

17. The method of claim 15 wherein said gelling agent is selected from the group consisting of xanthan, guar, hydroxyethylguar and starch.

18. The method of claim 15 wherein said gelling agent is xanthan.

19. The method of claim 15 wherein said gelling agent is present in an amount in the range of from about 0.25% to about 1% by weight of water in said viscous treating fluid.

20. The method of claim 15 wherein said pentanedione peroxide is present in an amount in the range of from about 0.1% to about 5% by weight of water in said viscous treating fluid.

21. The method of claim 15 wherein said viscous treating fluid further comprises a copper-EDTA chelate activator.

22. The method of claim 21 wherein said copper-EDTA chelate activator is present in an amount up to about 0.2% by weight of said pentanedione peroxide in said viscous treating fluid.

23. The method of claim 15 wherein said viscous treating fluid further comprises a diethylene triamine activator.

24. The method of claim 23 wherein said diethylene triamine activator is present in an amount up to about 2% by weight of said pentanedione peroxide in said viscous treating fluid.

25. The method of claim 15 wherein said viscous treating fluid further comprises a clay stabilizing and density increasing salt.

26. The method of claim 25 wherein said clay stabilizing salt is potassium chloride.

27. The method of claim 25 wherein said clay stabilizing and density increasing salt is present in an amount up to about 66% by weight of said viscous treating fluid.

28. A clean-up fluid for removing drill-in fluid filter cake from the walls of a well bore comprising:

water;
a salt for stabilizing clay and increasing the density of said fluid; and
a delayed viscosity breaker comprising pentanedione peroxide.

29. The clean-up fluid of claim 28 wherein said water is selected from the group consisting of fresh water and salt water.

30. The clean-up fluid of claim 28 wherein said pentanedione peroxide is present in an amount in the range of from about 0.1% to about 5% by weight of water in said fluid.

31. The clean-up fluid of claim 28 which further comprises a copper-EDTA chelate activator.

32. The clean-up fluid of claim 31 wherein said copper-EDTA chelate activator is present in an amount up to about 0.2% by weight of said pentanedione peroxide in said fluid.

33. The clean-up fluid of claim 28 which further comprises a diethylene triamine activator.

34. The clean-up fluid of claim 33 wherein said diethylene triamine activator is present in an amount up to about 2% by weight of said pentanedione peroxide in said fluid.

35. The clean-up fluid of claim 28 wherein said clay stabilizing and density increasing salt is potassium chloride.

36. The clean-up fluid of claim 28 wherein said clay stabilizing and density increasing salt is present in an amount up to about 66% by weight of water in said fluid.

37. A method of breaking a drill-in fluid filter cake comprising the steps of:

(a) providing a clean-up fluid comprised of water, a salt for stabilizing clay and increasing the density of said fluid and a delayed gel breaker comprising pentanedione peroxide; and (b) contacting said drill-in filter cake with said clean-up fluid.

38. The method of claim 37 wherein said water is selected from the group consisting of fresh water and salt water.

39. The method of claim 37 wherein said pentanedioine peroxide is present in an amount in the range of from about 0.1% to about 5% by weight of water in said fluid.

40. The method of claim of 37 which further comprises a copper-EDTA chelate activator.

41. The method of claim 40 wherein said copper-EDTA chelate activator is present in an amount up to about 0.2% by weight of said pentanedione peroxide in said fluid.

42. The method of claim 37 which further comprises a diethylene triamine actiavtor.

43. The method of claim 42 wherein said diethylene triamine activator is present in an amount up to about 2% by weight of said pentanedione peroxide in said fluid.

44. The method of claim 37 wherein said clay stabilizing and density increasing salt is potassium chloride.

45. The method of claim 37 wherein said clay stabilizing and density increasing salt is present in an amount up to about 66% by weight of water in said fluid.

* * * * *